US010020646B2

(12) United States Patent
Taki et al.

(10) Patent No.: US 10,020,646 B2
(45) Date of Patent: Jul. 10, 2018

(54) BUSBAR AND METHOD OF MANUFACTURING THE SAME

(71) Applicant: YAZAKI CORPORATION, Tokyo (JP)

(72) Inventors: Akihiro Taki, Shizuoka (JP); Yuji Tsuchiya, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 26 days.

(21) Appl. No.: 15/441,349

(22) Filed: Feb. 24, 2017

(65) Prior Publication Data

US 2017/0163020 A1 Jun. 8, 2017

Related U.S. Application Data

(63) Continuation of application No. PCT/JP2015/076786, filed on Sep. 18, 2015.

(30) Foreign Application Priority Data

Sep. 24, 2014 (JP) ................................ 2014-193436

(51) Int. Cl.
*H02G 5/02* (2006.01)
*H01B 13/24* (2006.01)
*H01B 7/02* (2006.01)

(52) U.S. Cl.
CPC ............. *H02G 5/02* (2013.01); *H01B 7/0275* (2013.01); *H01B 13/24* (2013.01)

(58) Field of Classification Search
CPC ... H05K 2201/023; H05K 2201/10272; H02G 5/005; H02G 5/002; H02G 15/00;
(Continued)

(56) References Cited

U.S. PATENT DOCUMENTS 3,758,702 A * 9/1973 Kogler .................... H02B 1/21
174/71 B
4,346,257 A * 8/1982 Moss .................... H02G 5/005
174/72 B
(Continued)

FOREIGN PATENT DOCUMENTS

JP H04-272618 A 9/1992
JP 2010-257950 A 11/2010
(Continued)

OTHER PUBLICATIONS

JP 2010257950 A English Translation.*
(Continued)

*Primary Examiner* — Pete Lee
(74) *Attorney, Agent, or Firm* — MetroLexis Law Group, PLLC

(57) ABSTRACT

A busbar includes: an elongated busbar body which is composed of an electrically conductive material; and an insulating coating which covers the circumference of the busbar body. The cross section of the busbar body orthogonal to the longitudinal direction is substantially rectangular. The insulating coating is composed of a light curing resin which has an elongation percentage of not less than 50% after being cured and a Young's modulus of not more than 900 MPa. And the insulating coating is formed by applying the light curing resin onto the surface of the busbar body and then curing the applied light curing resin. The light curing resin has a viscosity of 10 to 1000 Pa·s at 25° C.

20 Claims, 5 Drawing Sheets

(58) Field of Classification Search
CPC ............ H02G 5/007; H02G 5/00; H02G 3/00; H02G 3/30; H02B 1/21; H02B 1/20
See application file for complete search history.

(56) References Cited

U.S. PATENT DOCUMENTS

| | | | | |
|---|---|---|---|---|
| 4,382,156 | A | * 5/1983 | Jodoin | .................... H02G 5/005 |
| | | | | 174/72 B |
| 2014/0151082 | A1 | * 6/2014 | Erdle | ........................ H02B 1/20 |
| | | | | 174/68.2 |
| 2015/0279520 | A1 | 10/2015 | Koda | |

FOREIGN PATENT DOCUMENTS

| | | | |
|---|---|---|---|
| JP | 2010-257951 | A | 11/2010 |
| JP | 2014-107201 | A | 6/2014 |
| JP | 2014-114444 | A | 6/2014 |
| JP | 2014-116295 | A | 6/2014 |

OTHER PUBLICATIONS

Japanese Official Action dated Apr. 18, 2017 in the counterpart Japanese patent application.
Japanese Office Action dated Jun. 27, 2017 in the counterpart Japanese patent application.
Written Opinion of the International Searching Authority (Form PCT/ISA/237) dated Nov. 17, 2015 in PCT International application PCT/JP2015/076786 (English translation of the Written Opinion will be issued and uploaded to Patentscope of WIPO.).

* cited by examiner

FIG. 5A
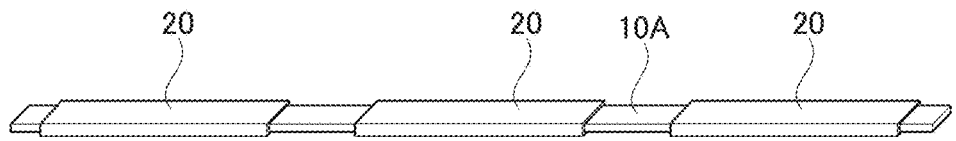
FIG. 5B
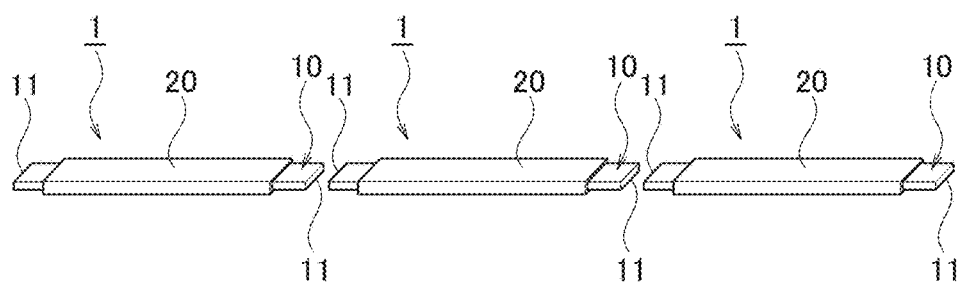
FIG. 6
| VISCOSITY AT 25°C (Pa·s) | CROSS-SECTIONAL IMAGE | IMAGE FIGURE |
|---|---|---|
| 1 | | |
| 10 | | |

BUSBAR AND METHOD OF MANUFACTURING THE SAME

CROSS REFERENCE TO RELATED APPLICATION

This application is a Continuation of PCT Application No. PCT/JP2015/076786, filed on Sep. 18, 2015, and claims the priority of Japanese Patent Application Nos. 2014-193436, filed on Sep. 24, 2014, the content of all of which is incorporated herein by reference.

BACKGROUND

1. Technical Field

The present invention relates to a busbar and a method of manufacturing a busbar. Specifically, the present invention relates to a busbar which is connected to a power supply and supplies electricity to electric parts and relates to a method of manufacturing the same.

2. Related Art

A power supply circuit or the like conventionally uses a busbar which is connected to a power supply, such as a battery, and supplies electricity to electric parts and the like. The busbar is provided with an insulating coating therearound to prevent a short circuit between the busbar and another busbar adjacent thereto or the like.

For manufacturing such a busbar including an insulating coating, there are some methods. In a simple method, a heat-shrinkable tube is inserted into an electrically conductive member composed of an electrically conductive material and is heat-shrunk to form an insulating coating around the electrically conductive member. Such an insulating coating has a low heat resistance and is difficult to use in high-voltage or high-temperature sections. Applications of the insulating coating to automobiles are therefore limited. Another method of manufacturing a busbar uses insert molding to form an insulating coating. However, insert molding requires preparation of a dedicated mold, increasing costs of small lot products.

Accordingly, other methods are being examined, in which insulating resin is applied on the electrically conductive member and then cured to form an insulating coating. To be specific, in one of the methods which are being examined, thermosetting resin or ultraviolet curable resin is used as the insulating resin. The thermosetting resin or ultraviolet curable resin is applied to the electrically conductive member and is cured. However, it takes comparatively long time to cure the thermosetting resin. Accordingly, ultraviolet curable resin, which has been practically used in optical fiber cables, is attracting attentions. Moreover, curing of ultraviolet curable resin can be finished within a short period of time.

Patent Literature 1 discloses a method of applying ultraviolet curable material. The method uses two types of ultraviolet curable material having different viscosities so that coating film is formed so that bubbles are not involved between strands.

Patent Literature 1: Japanese Unexamined Patent Application Publication No. 4-272618

SUMMARY

When ultraviolet curable resin is applied to an electrically conductive member having a rectangular cross-section by the method of Patent Literature 1, the thickness of the resultant insulating coating could be insufficient at edges of the electrically conductive member. To be specific, the thickness of the ultraviolet curable resin can be even to a certain degree by using a die to remove excessive ultraviolet curable resin and by examining the shape of the die. However, even if such a die is used, resin is applied more on flat surfaces of the busbar while the resin is applied less to the edges. It is therefore difficult to form an insulating coating with an even thickness in the surface of the busbar. If comparatively high voltage is applied to a busbar, the insulating coating could break and not maintain insulation of the busbar.

The present invention was made in the light of the aforementioned problems involved in the conventional art. An object of the present invention is to provide a busbar including an insulating coating excellent in electrical insulation and durability and a method of manufacturing the busbar.

A busbar according to a first aspect of the present invention includes: an elongated busbar body which is composed of an electrically conductive material; and an insulating coating which covers the circumference of the busbar body. The cross section of the busbar body orthogonal to the longitudinal direction is substantially rectangular. The insulating coating is composed of a light curing resin which has an elongation percentage of not less than 50% after being cured and a Young's modulus of not more than 900 MPa. And the insulating coating is formed by applying the light curing resin onto the surface of the busbar body and then curing the applied light curing resin. The light curing resin has a viscosity of 10 to 1000 Pa·s at 25° C.

A busbar according to a second aspect of the present invention is the busbar according the first or second aspect in which after the light curing resin is applied onto the surface of the busbar body with an extruder, the light curing resin is irradiated with light energy to be cured.

A method of manufacturing a busbar according to a third aspect of the present invention includes: the steps of applying a light curing resin to the circumference of an elongated busbar body which is composed of an electrically conductive material, the light curing resin having a viscosity of 10 to 1000 Pa·s at 25° C.; and the steps of irradiating the light curing resin with light energy to cure the light curing resin. The cross section of the busbar body orthogonal to the longitudinal direction is substantially rectangular.

BRIEF DESCRIPTION OF DRAWINGS

FIG. 5A and FIG. 5B are schematic views illustrating a method of manufacturing a busbar according to the embodiment of the present invention.

FIG. 6 is a diagram illustrating the results of observing cross sections of busbar bodies according to Example 1.

DETAILED DESCRIPTION

Hereinafter, a description is given of an embodiment of the present invention using the drawings. The dimensional ratios in the drawings are exaggerated for convenience of explanation, and some of the ratios are different from actual ones.

[Busbar]

Figure 1:
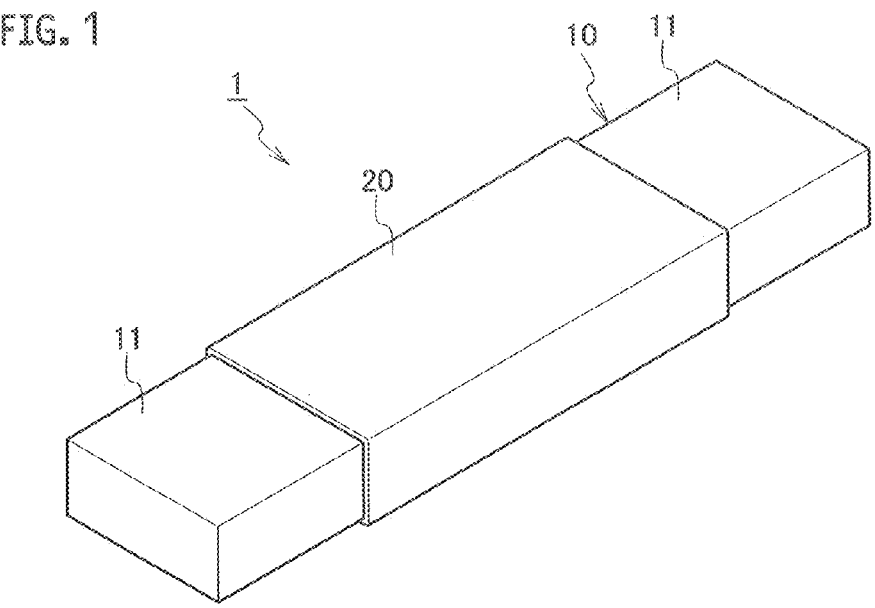
FIG. 1 is a perspective view illustrating a busbar according to an embodiment of the present invention.

As illustrated in FIG. 1, a busbar 1 according to the embodiment of the present invention includes: an elongated busbar body 10 composed of an electrically conductive material; and an insulating coating 20 covering the circumference of the busbar body 10.

The busbar body 10 has an elongated shape as illustrated in FIG. 1, and the cross section thereof orthogonal to the longitudinal direction is substantially rectangular. At both ends of the busbar body 10, connecting sections 11 are provided. The connecting sections 11 are configured to be connected to a power supply such as a battery, various types of electric parts, or the like. The material constituting the busbar body 10 is not limited particularly as long as the material is electrically conductive. The material constituting the busbar body 10 can be a publicly-known conductive metal material such as copper, copper alloys, aluminum, and aluminum alloys, for example. The material constituting the busbar body 10 can be a conductor composed of the conductive metal material with the surface being plated.

Figure 2A:
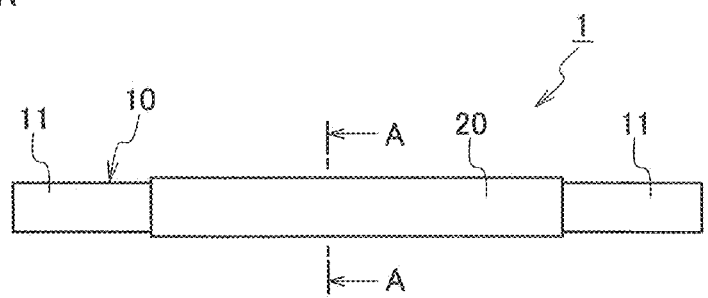
FIG. 2A is a side view illustrating the busbar according to the embodiment of the present invention.
Figure 2B:
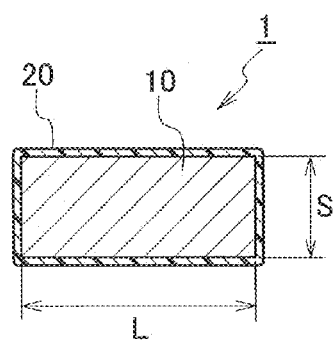
FIG. 2B is a cross-sectional view along a line A-A of FIG. 2A.

As illustrated in FIG. 2, the cross section of the busbar body 10 is substantially rectangular. The cross-sectional shape of the busbar body 10 is not limited to a complete rectangle, and the corners of the busbar body 10 may be chamfered. In this specification, the cross section of the busbar body 10 is therefore expressed as "being substantially rectangular".

The lengths of a long side L and a short side S of the cross section of the busbar body 10 are properly selected in consideration of the size of space given to connect electric parts in an automobile, an amount of current flowing therethrough, and the characteristics such as bending workability. The length of the long side L of the busbar body 10 is preferably 3 to 30 mm while the length of the short side S is preferably 1 to 5 mm, for example. The ratio (the aspect ratio, L; S) of the long side L to the short side S in the cross section of the busbar body 10 is not limited particularly and is preferably 3 to 30 and more preferably 5 to 20, for example.

The insulating coating 20 is formed by applying light curing resin providing electrical insulation on the surface of the busbar body 10 and then irradiating the applied resin with light energy for cross-linking and curing of the resin. The light curing resin can be at least one of ultraviolet curable resin which is cured by ultraviolet irradiation and visible-light curable resin which is cured by visible light irradiation.

The ultraviolet curable resin which can be used in the embodiment contains at least a photopolymerizable oligomer or monomer and a photopolymerization initiator The photopolymerizable oligomer is an oligomer including two or more functional groups having an unsaturated double bond. The photopolymerizable oligomer can be at least one selected from the group consisting of epoxy acrylate-based, epoxidized oil acrylate-based, urethane acrylate-based, polyester urethane acrylate-based, polyether urethane acrylate-based, polyester acrylate-based, polyether acrylate-based, vinyl acrylate-based, silicone acrylate-based, polybutadiene acrylate-based, polystyrene ethyl methacrylate-based, polycarbonate dicarbonate-based, unsaturated polyester-based, and polyethylene/thiol-based oligomers. The functional group including an unsaturated double bond can be at least one selected from the group consisting of an acryloyl group, a methacryloyl group, an aryl group, and a vinyl group, for example.

The photopolymerizable monomer can be a publicly-known compound including in a molecule, at least one selected from the group consisting of an acryloyl group, a methacryloyl group, an aryl group, and a vinyl group.

The photopolymerization initiator is a compound which serves to initiate polymerization reaction of the photopolymerizable oligomer or monomer and has a role of generating free radicals through ultraviolet irradiation. Ultraviolet curing requires these free radicals. The photopolymerization initiator is a substance which absorbs light of a specific wavelength from ultraviolet light and is excited to generate radicals. The photopolymerization initiator can be at least one selected from the group consisting of benzoin ethers, ketals, acetophenones, benzophenones, and thioxanthones, for example. The photopolymerization initiator can be selected from various compounds according to the intended use.

The ultraviolet curable resin according to the embodiment can contain at least one of additives shown below. The additives include a photopolymerization initiator aid, an anti-adhesive agent, a filler, a plasticizer, a non-reactive polymer, a colorant, a flame retardant, a flame retardant assistant, an anti-softening agent, a mold-release agent, a desiccant agent, a dispersant, a wetting agent, a suspending agent, a thickener, a charge-preventing agent, an antistatic agent, a flattening agent, an anti-blocking agent, an anti-skinning agent, a surfactant, and the like.

The visible light curable resin that can be used in the embodiment is resin which is cured by irradiation with light having a wavelength of about 400 nm or more. Using such a visible light curable resin enables curing with a simple irradiation system using a halogen lump or the like, reducing the cost of the irradiation system. The visible light curable resin can be selected from VL-series made by Three-bond Co., Ltd., for example. The visible light curable resin can contain the above-described additives according to the need.

In the embodiment, the insulating coating 20 covers the busbar body 10 other than the connecting sections 11. The thickness of the insulating coating 20 is not particularly limited as long as the electrical insulation of the busbar body 10 is ensured. The thickness of the insulating coating 20 is properly determined depending on the material of the insulating coating 20 and can be 1 μm to 1 mm, for example. When the insulating coating 20 is made of epoxy acrylate, urethane acrylate, or a polymer of acrylate monomers, the thickness thereof is preferably set to about 100 to 800 μm. The thickness of the insulating coating 20 can be measured by observing a cross section of the busbar 1 using an optical microscope.

The light curing resin is cured instantly when irradiated with light energy and does not require cleaning and drying steps Accordingly, it is possible to perform the subsequent step quickly, thus shortening the process. When the light curing resin having a low viscosity is applied to the busbar body 10, the applied light curing resin runs down and is distributed unevenly before irradiation of light energy. If the unevenly-distributed resin is irradiated with light energy, the resultant insulating coating has an uneven thickness and provides insufficient electrical insulation at some sections. When the light curing resin has a low viscosity, moreover, the amount of resin adhering to the edges of the busbar body 10 is likely to be small in particular. Accordingly, the insulating coating does not secure sufficient thickness, which could cause a short circuit at the edges.

On the other hand, in the busbar 1 of the embodiment, the insulating coating 20 is formed by applying light curing resin with a viscosity of 10 to 1000 Pa·s at 25° C. on the surface of the busbar body 10 and then curing the applied resin. By setting the viscosity of the light curing resin to not less than 10 Pa·s, the light curing resin is prevented from dripping when applied to the busbar body 10, and the resultant insulating coating 20 has a substantially even thickness. Moreover, it is possible to prevent the light curing resin from being applied less at the edges of the busbar body 10, thus providing sufficient electrical insulation. Furthermore, setting the viscosity of the light curing resin to not less than 10 Pa·s facilitates applying the light curing resin to the busbar body 10, thus preventing reduction in productivity. From the viewpoint of preventing dripping and increasing the productivity, the viscosity of the light curing resin at 25° C. is preferably 20 to 200 Pa·s and more preferably 30 to 100 Pa·s. The viscosity of the light curing resin is measured with a viscometer.

The busbar of the embodiment can be used to connect electric parts of an automobile. To use the busbar in automobiles, the insulating coating 20 needs to be made of light curing resin which has an elongation percentage (tensile strain) of not less than 50% after being cured and a Young's modulus (tensile modulus) of not more than 900 MPa (2.5% tensile strength) as the initial characteristics. In the light of the vehicle environment such as vibration, routing for attachment of the busbar, and the like, the light curing resin needs to satisfy the aforementioned elongation percentage and Young's modulus at least at room temperature as an insulator for automobiles When the light curing resin does not satisfy these requirements, the busbar is subject to insulation breakdown and does not satisfy voltage resistance of 1 kV for 1 min. From the viewpoint of providing sufficient heat-resistant life, the initial elongation percentage needs to be not less than 50%. The elongation percentage (tensile strain) and Young's modulus (tensile modulus) of the insulating coating can be measured by a room temperature tensile test according to Japanese Industrial Standards JIS K7161 (Plastics—Determination of tensile properties-, Part 1: General principles).

The busbar 1 according to the embodiment is composed of an electrically conductive material and includes the elongated busbar body 10 and the insulating coating 20 covering the circumference of the busbar body 10. The cross section of the busbar body 10 orthogonal to the longitudinal direction is substantially rectangular. The insulating coating 20 is made of light curing resin having an elongation percentage of not less than 50% after being cured and a Young's modulus of not more than 900 MPa. Since the insulating coating 20 providing high electrical insulation and durability is formed in the surface of the busbar 1 as described above, the busbar 1 is suitably applicable to power supply circuits and the like in which application of comparatively high voltage causes an issue of insulation. The busbar 1 is also applicable to other electric circuits through which electric current flows.

The insulating coating 20 is formed by applying a light curing resin having a viscosity of 10 to 1000 Pa·s at 25° C. on the surface of the busbar body 10 and then curing the applied resin. This allows the insulating coating 20 to have a substantially even thickness and a stabilized shape. It is therefore possible to provide sufficient electrical insulation even at the edges.

[Method of Manufacturing Busbar]

Next, a description is given of a method of manufacturing a busbar of the embodiment. The manufacturing method according to the embodiment includes: a step of applying a light curing resin with a viscosity of 10 to 1000 Pa·s at 25° C. to the circumference of an elongated busbar body composed of an electrically conductive material; and a step of irradiating the light curing resin with light energy to cure the light curing resin.

In the busbar 1 of the embodiment, first, the aforementioned light curing resin is applied to the surface of the busbar body 10. The method of applying the light curing resin is not particularly limited. The light curing resin can be applied using a role coater, a bar coater, a gravure coater, a spray coater, a dip coater, or the like, for example.

As described above, the viscosity of the light curing resin to be applied to the busbar body 10 is 10 to 1000 Pa·s at 25° C. This prevents the resin from dripping and enables the resin to be applied to a substantially even thickness. The method of adjusting the viscosity is not particularly limited but is preferably implemented by increasing the molecular weight of the photopolymerizable oligomer or monomer or using a rheology control agent, for example.

Next, the busbar body 10 with the light curing resin applied thereto is irradiated with light energy. The amount of light energy and the irradiation time can be properly configured depending on the used light curing resin and the amount of the resin applied to the busbar body 10. By irradiating the light curing resin with light energy, the light curing resin is instantly cured before the light curable resin is distributed unevenly, and the insulating coating 20 is formed on the surface of the busbar body 10. Meanwhile, it is known that the light curing resin is subject to reaction inhibition when coming into contact with oxygen at the process of curing. One of the causes for the reaction inhibition is as follows: oxygen in the air reacts with radicals generated from the photopolymerization initiator to remove the radicals, reducing the polymerization reaction of the light curing resin. Accordingly, curing of the resin is not promoted sufficiently. It is therefore preferable for the light curing resin to be irradiated with light energy under nitrogen gas atmosphere. This prevents the removal of radicals due to reaction with oxygen in the air and efficiently promotes curing reaction.

After the light curing resin is cured by irradiation with light energy, a step of cooling the insulating coating 20 may be performed if necessary. The method of cooling the insulating coating 20 may be a method of cooling the insulating coating 20 by feeding air into contact with the insulating coating 20, for example.

Figure 3:
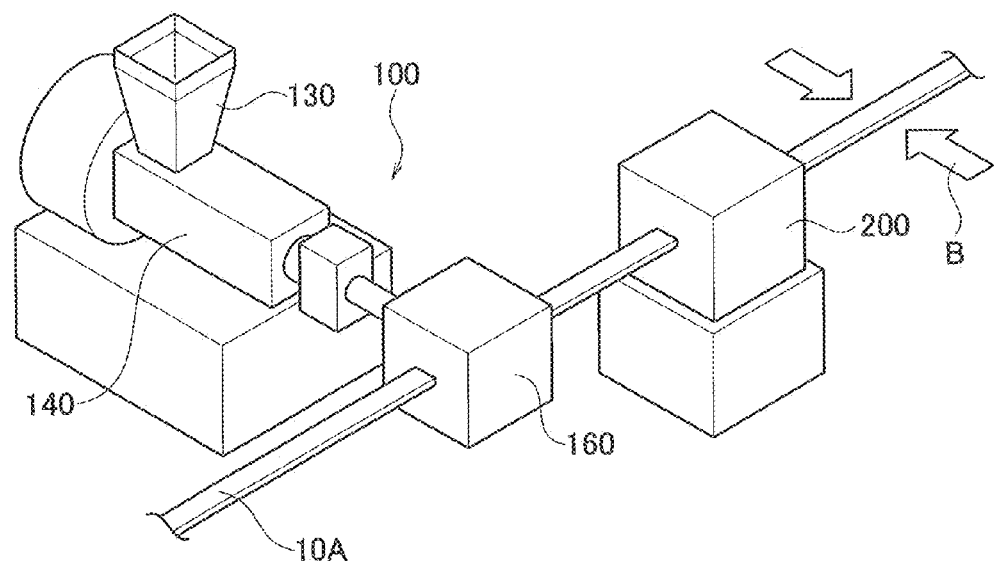
FIG. 3 is a schematic view illustrating an apparatus manufacturing the busbar according to the embodiment of the present invention.
Figure 4:
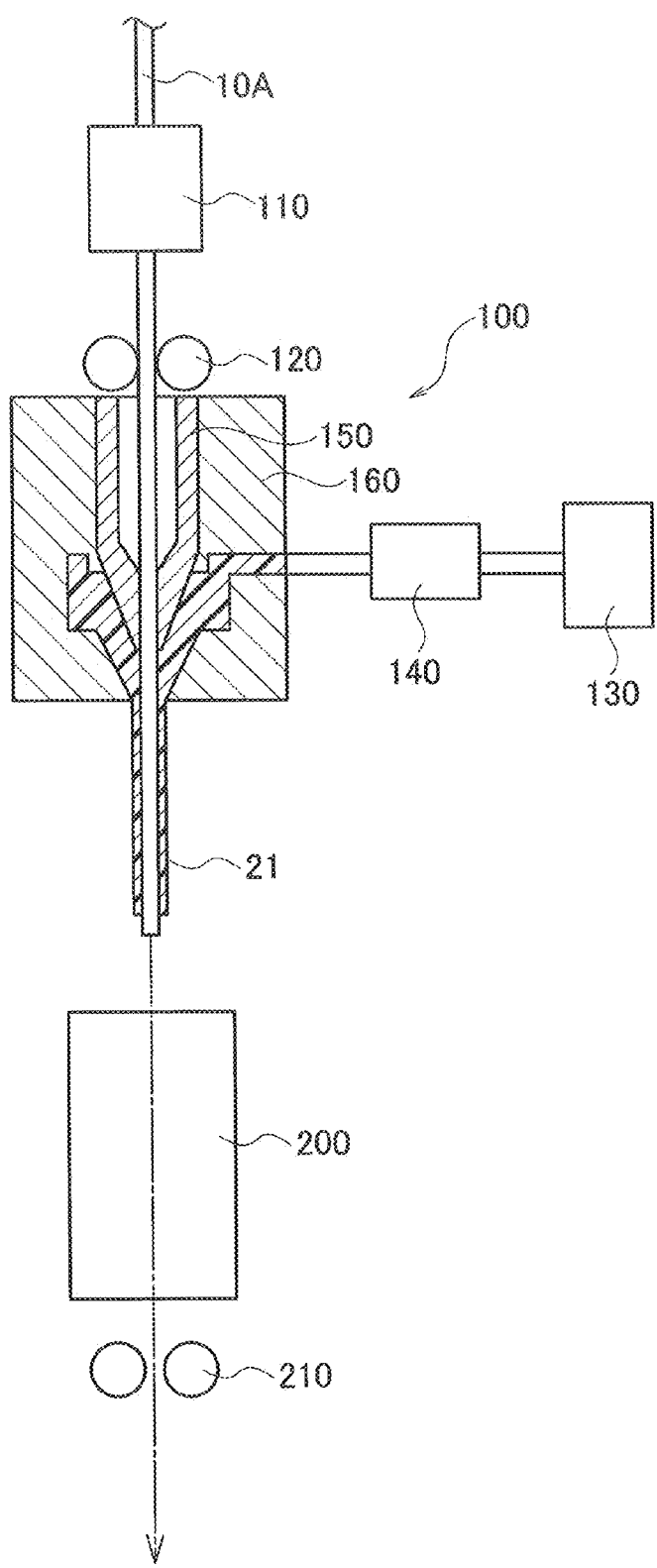
FIG. 4 is a schematic view for explaining the configuration of the apparatus manufacturing the busbar.

From the viewpoint of increasing the productivity, the busbar 1 of the embodiment is preferably manufactured using an extruder 100 and a light energy irradiator 200 as illustrated in FIGS. 3 and 4. The extruder 100 includes a guide 110 and rollers 120 which feed a later-described busbar continuous body 10A into a mandrel 150. The extruder 100 further includes the mandrel 150 and a die 160 provided so as to cover the mandrel 150. The mandrel 150 includes a circular passage which locates the busbar continuous body 10A while allowing the busbar continuous body 10A to pass therethrough. The extruder 100 further includes a tank 130 holding the light curing resin and a liquid-feeding pump 140 configured to feed the light curing resin into the die 160.

In the manufacturing method according to the embodiment, the busbar continuous body 10A which is composed of the busbar bodies 10 continuous in the longitudinal direction is prepared at first. The method of preparing the busbar continuous body 10A is not particularly limited. The busbar continuous body 10A may be prepared by stamping using a press or by slitting, for example.

Next, the prepared busbar continuous body 10A is fed into the mandrel 150 by the guide 110 and rollers 120. Light curing resin 21 in a fluidized state is then pressure-fed into between the mandrel 150 and die 160 using the liquid-feeding pump 140 and is extruded from the top end of the die 160. The light curing resin 21 thereby adheres to the surface of the busbar continuous body 10A.

The busbar continuous body 10A with the light curing resin 21 applied thereto is caused to pass through the light energy irradiator 200, so that the light curing resin 21 is cross-linked and cured. As illustrated in FIG. 4, the busbar continuous body 10A with the light curing resin 21 cured passes between take-up rollers 210. Thereafter, the busbar continuous body 10A is cut with a cutter (not illustrated), thus producing the busbars 1. The insulating coating 20 may be cooled just after the irradiation with light energy if necessary by feeding air to the busbar continuous body 10A as indicated by arrows B in FIG. 3.

The connection sections 11 of the busbar 1 can be formed by peeling the insulating coating 20 at the ends of the busbar 1. The connection sections 11 may be formed by forming insulating coatings 20 at predetermined intervals on the busbar continuous body 10A as illustrated in FIG. 5A and then cutting the busbar continuous body 10A at the places where the insulating coatings 20 are not formed as illustrated in FIG. 5B.

In one of the methods to produce the insulating coating, as described above, the light curing resin is applied and is irradiated with light energy to be cured. Such a manufacturing method is also performed in the process to manufacture an optical fiber, and a manufacturing method called drawing is known, for example. The drawing process is a method in which a preform of quartz or the like is put into an electric furnace vertically; the quartz is molten and pulled under its own weight into a fiber; and the drawn quartz is covered with protecting resin and then wound, thus preparing an optical fiber strand. As for the busbar of the embodiment, the insulating coating 20 can be formed with the busbar being extended in the vertical direction like the drawing process. However, it is difficult for the busbar continuous body 10A to be supplied to the extruder 100 and light energy irradiator 200 because conductors having a thick flat section, such as the busbar continuous body 10A, needs a large stress to be bent. On the other hand, when the busbar continuous body 10A is supplied horizontally to the extruder 100 and light energy irradiator 200 as illustrated in FIG. 3, the supplied thick busbar continuous body 10A is prevented from bending, and the insulating coating 20 can be provided quantitatively.

When the supplied busbar continuous body 10A is prevented from bending, the busbar continuous body 10A is less likely to be caught at the opening of the mandrel 150 which fit to the long and short sides of the busbar continuous body 10A, thus increasing the productivity of the busbars 1. When the supplied busbar continuous body 10A is prevented from bending, moreover, the center of the busbar continuous body 10A is prevented from being shifted from the center of the top end of the die 160, so that the insulating coating 20 is less likely to vary in thickness on the left, right, top, and bottom.

As described above, the viscosity of the light curing resin to be applied to the busbar continuous body 10A at 25° C. is 10 to 1000 Pa·s. Accordingly, even when the busbar continuous body 10A is moved in the horizontal direction as illustrated in FIG. 3, the light curing resin is prevented from dripping and can be applied with a substantially even thickness. Using the light curing resin as the insulating coating 20, it is possible to obtain the insulating coating having high productivity and high dimensional stability. When the insulating coating is manufactured by extrusion of thermally-plastic resin like the conventional method, it is necessary to provide a cooler and set the extruder to high temperature. However, in the process of forming the insulating coating made of light curing resin, it is unnecessary to provide a cooler and set the extruder to a high temperature. This can reduce the control factors and moreover reduce the space for manufacturing.

EXAMPLE

Hereinafter, the present invention is described in detail by reference with examples. The present invention is not limited to those examples.

Example 1

Ultraviolet curable resins having different viscosities were caused to adhere to busbar bodies using an extruder for examination of the presence of drips. Specifically, busbar bodies made of aluminum were prepared, each having a rectangular cross section with a 15 mm long side and a 1.4 mm short side.

Next, the ultraviolet curable resins were applied to the circumferences of the busbar bodies using an extruder made by Toyo Seiki Seisaku-sho, Ltd. In this process, the busbar bodies were adjusted so as to be fed to the extruder in the substantially horizontal direction. As the ultraviolet curable resins, EBECRYL (product name, registered trademark) 140 (made by DAICEL ALLNEX LTD.) having a viscosity of 1 Pa·s at 25° C. and EBECRYL (product name, registered trademark) 8311 (made by DAICEL ALLNEX LTD.) having a viscosity of 10 Pa·s were used. FIG. 6 illustrates cross sections of the busbar bodies ten seconds after the ultraviolet curable resins were applied.

As illustrated in FIG. 6, the ultraviolet curable resin with a viscosity of 1 Pa·s sagged and moved to the bottom of the busbar body 10. If the ultraviolet curable resin in such a state is irradiated with ultraviolet light, the insulating coating 20 will become uneven in thickness. Moreover, the insulating coating will be thin at the edges of the busbar body 10, producing a risk of providing insufficient electrical insulation. On the other hand, the ultraviolet curable resin with a viscosity of 10 Pa·s sagged very little. If the ultraviolet curable resin in such a state is irradiated with ultraviolet light, the insulating coating 20 will have a substantially even thickness and will provide sufficient electrical insulation even at the edges. As described above, it was revealed that even when the ultraviolet curable resin having a viscosity of not less than 10 Pa·s at 25° C. was applied to the busbar body 10 positioned substantially horizontally, the ultraviolet curable resin was prevented from sagging and the resultant insulating coating had substantially even thickness.

Example 2

Figure 7:
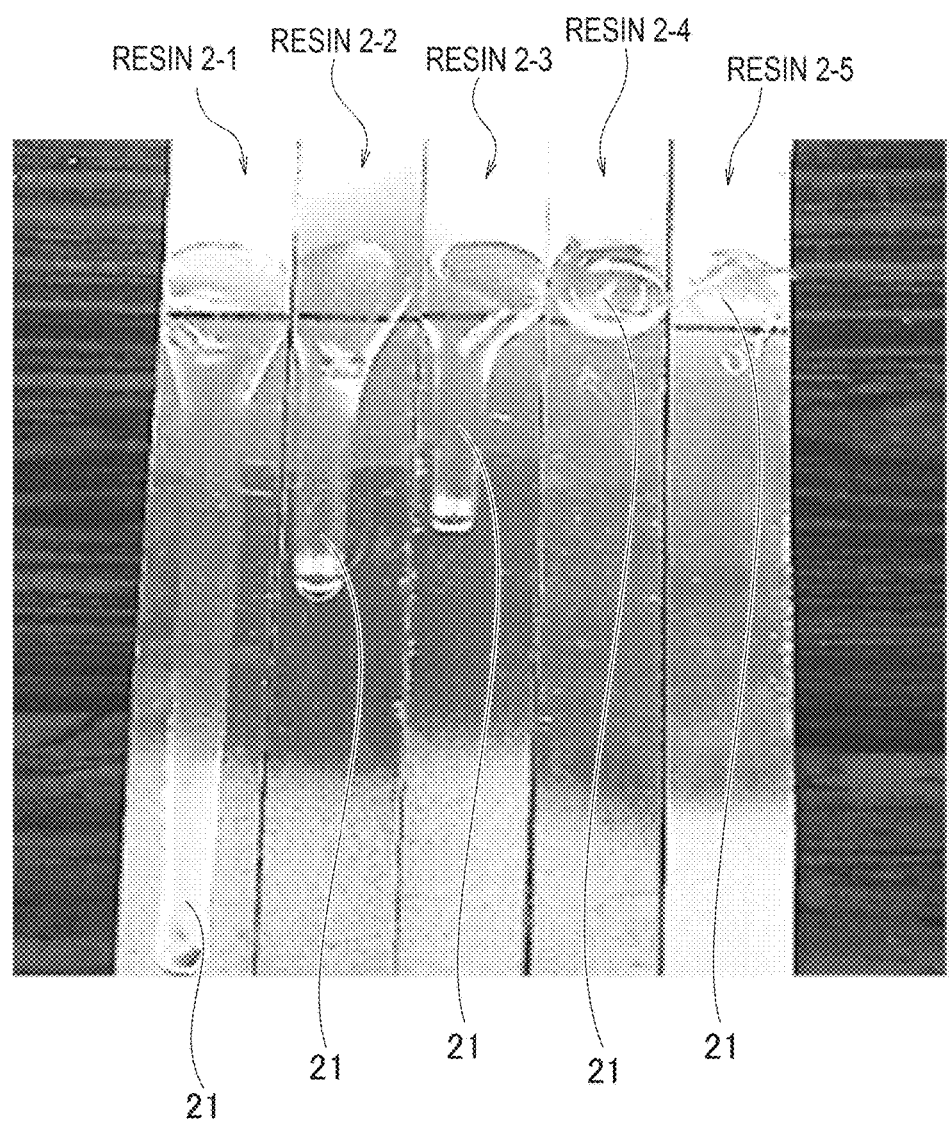
FIG. 7 is a diagram illustrating results of observing dripping of ultraviolet curable resins.

Five types of ultraviolet curable resins having different viscosities at 25° C. were dropped onto the busbar bodies 10, and the busbar bodies 10 were then tilted vertically and held for 10 seconds. Thereafter, drips of the ultraviolet curable resins were observed. The ultraviolet curable resins used in Example 2 are shown below. The busbar bodies were the same as those of Example 1. FIG. 7 illustrates the result of observing the drips.

TABLE 1

| | ULTRAVIOLET CURABLE RESIN | VISCOSITY (Pa·s, 25° C.) |
|---|---|---|
| Resin 2-1 | EBECRYL 140 BY DICEL ALLNEX LTD. | 1 |
| Resin 2-2 | EBECRYL 1606 BY DICEL ALLNEX LTD. | 3 |
| Resin 2-3 | EBECRYL 8311 BY DICEL ALLNEX LTD. | 10 |
| Resin 2-4 | TB3081J by THREE-BOND Co., Ltd. | 95 |
| Resin 2-5 | U-6LPA by Shin-Nakamura Chemical Co., Ltd. | 400 |

As illustrated in FIG. 7, resins 2-1 and 2-2 having viscosities of less than 10 Pa·s dripped much more than Resin 203. Accordingly, it is considered that the resultant insulating coatings will be distributed unevenly and will be thin at the edges. On the other hand, resins 2-4 and 2-5 dripped very little, and it is considered that the resultant insulating coatings 20 will have a substantially even thickness.

Example 3

Test pieces were prepared using three types of ultraviolet curable resins illustrated in Table 2, and the elongation percentage and Young's modulus thereof were measured.

TABLE 2

| | ULTRAVIOLET CURABLE RESIN | | VISCOSITY (Pa·s, |
|---|---|---|---|
| | PRODUCT NAME | GRADE | 25° C.) |
| Resin 3-1 | SHIKOH (registered trademark) by The Nippon Synthetic Chemical Industry Co., Ltd. | UV-6640B | 25 |
| Resin 3-2 | SHIKOH (registered trademark) by The Nippon Synthetic Chemical Industry Co., Ltd. | UV-2750B | 25 |
| Resin 3-3 | SHIKOH (registered trademark) by The Nippon Synthetic Chemical Industry Co., Ltd. | UV-7461TE | 90 |

(Test Piece Preparation Method)
The ultraviolet curable resin was dropped on glass plates and was spread using an applicator so as to have an even thickness Thereafter, the ultraviolet curable resin was cured using a UV lamp, thus preparing resin sheets.
(Measurement of Elongation percentage and Young's Modulus)
The resin sheets obtained as described above were subjected to a room temperature tensile test according to Japanese Industrial Standards JIS 1(7161. To be specific, first, the resin sheets were left at room temperature (25° C.) for 12 hours or more and then cut, preparing test pieces (JIS No. 2 dumbbell test pieces) made of resins 3-1 to 3-3. The initial elongation percentage (tensile strain) and the Young's modulus (tensile modulus) of the test pieces were measured at a test temperature of 23+/−2° C., a pulling rate of 1 mm/min, and a humidity of 50+/−10% RH.
The test pieces made of resins 3-1 to 3-3 were heated at 150° C. in the air for three hours and then measured in terms of the elongation percentage (tensile strain) and the Young's modulus (tensile modulus) as described above. Table 3 shows the elongation percentage and Young's modulus of the initial test pieces which were not heat-treated and teat pieces which were already heat-treated.
(Bending Test)
The teat pieces made of resins 3-1 to 3-3 were bent at 90 degrees, and it was visually observed whether the teat pieces cracked. Moreover, the teat pieces made of resins 3-1 to 3-3 were subjected to the aforementioned heat treatment and then were bent at 90 degrees. It was then visually observed whether the test pieces cracked. The results of observing cracks are also shown in Table 3.

TABLE 3

| | ELONGATION PERCENTAGE (%) | YOUNG'S MODULUS (MPa) | INITIAL 90° BENDING | 90° BENDING AFTER HEAT TREATMENT |
|---|---|---|---|---|
| Resin 3-1 | 85 | 90 | No crack | No crack |
| Resin 3-2 | 40 | 900 | Crack was observed | Crack was observed |
| Resin 3-3 | 12 | 600 | No crack | Crack was observed |

As illustrated in Table 3, resin 3-1, which had an elongation percentage of not less than 50% after being cured and a Young's modulus of not more than 900 MPa, was prevented from cracking both in the initial bending test and in the bending test after the heat treatment. This reveals that such ultraviolet curable resin has high voltage resistance and is excellent as an insulator for automobiles. On the other hand, resins 3-2 and 3-3 had viscosities of not less than 10 Pa·s at 25° C. but had an elongation percentage of less than 50%. Resins 3-2 and 3-3 cracked at least in the bending tests after the heat treatment. Accordingly, it is found that resins 3-2 and 3-3 have a short heat resistant life and is not suitable as an insulator for automobiles.

Although the present invention has been described above by reference to the embodiment and examples, the present invention is not limited to those, and it will be apparent to those skilled in the art that various modifications can be made without departing from the scope of the invention.

INDUSTRIAL APPLICABILITY

The busbar of the present invention has high durability as well as high electrical insulation since the insulating coating has a predetermined elongation percentage and a predetermined Young's modulus. The busbar is suitably applicable to power supply circuits and the like in which application of comparatively large voltage causes an issue of insulation.

What is claimed is:
1. A busbar, comprising:
an elongated busbar body which is composed of an electrically conductive material; and
an insulating coating which covers the circumference of the busbar body, wherein
the cross section of the busbar body orthogonal to the longitudinal direction is substantially rectangular,
the insulating coating is composed of a light curing resin which has an elongation percentage of not less than 50% after being cured and a Young's modulus of not more than 900 MPa, and
the insulating coating is formed by applying the light curing resin onto the surface of the busbar body and then curing the applied light curing resin, the light curing resin having a viscosity of 20 to 1000 Pa·s at 25° C.

2. The busbar according to claim 1, wherein after the light curing resin is applied onto the surface of the busbar body with an extruder, the light curing resin is irradiated with light energy to be cured.

3. A method of manufacturing a busbar, comprising:
applying a light curing resin to the circumference of an elongated busbar body which is composed of an electrically conductive material, the light curing resin having a viscosity of 20 to 1000 Pa·s at 25° C.; and
irradiating the light curing resin with light energy to cure the light curing resin, wherein
the cross section of the busbar body orthogonal to the longitudinal direction is substantially rectangular.

4. The busbar according to claim 1, wherein connecting sections are provided at both ends of the busbar body.

5. The busbar according to claim 1, wherein corners of the rectangular cross section of the busbar body are chamfered.

6. The busbar according to claim 1, wherein a long side length and a short side length of the cross section of the busbar body are selected based on one or more of: a size of a space given to connect electric parts in an automobile, an amount of current flowing therethrough, and a bending workability.

7. The busbar according to claim 6, wherein the long side length of the busbar body comprises a length of from 3 to 30 mm and the short side length comprises a length of from 0.1 to 5 mm.

8. The busbar according to claim 6, wherein a ratio of the long side length to the short side length in the cross section of the busbar body is 3 to 30.

9. The busbar according to claim 6, wherein a ratio of the long side length to the short side length in the cross section of the busbar body is 5 to 20.

10. The busbar according to claim 1, wherein the light curing resin comprise one of an ultraviolet curable resin and a visible-light curing resin.

11. The method according to claim 3, wherein the light curing resin and the light energy comprise at least one of: an ultraviolet curable resin and ultraviolet light energy; and a visible-light curable resin and visible light energy.

12. The method according to claim 3, wherein the light curing resin comprises ultraviolet curable resin containing at least a photopolymerizable oligomer or monomer and a photopolymerization initiator.

13. The method according to claim 12, wherein the photopolymerizable oligomer is an oligomer including two or more functional groups having an unsaturated double bond.

14. The method according to claim 13, wherein the photopolymerizable oligomer is selected from the group consisting of at least one of: an epoxy acrylate-based oligomer, an epoxidized oil acrylate-based photopolymerizable oligomer, a urethane acrylate-based oligomer, a polyester urethane acrylate-based oligomer, a polyether urethane acrylate-based oligomer, a polyester acrylate-based oligomer, a polyether acrylate-based oligomer, a vinyl acrylate-based oligomer, a silicone acrylate-based photopolymerizable oligomer, a polybutadiene acrylate-based oligomer, a polystyrene ethyl methacrylate-based oligomer, a polycarbonate dicarbonate-based oligomer, an unsaturated polyester-based oligomer, and a polyethylene/thiol-based oligomer.

15. The method according to claim 13, wherein the functional group in the oligomer including two or more functional groups having the unsaturated double bond is selected from the group consisting of at least one of: an acryloyl group, a methacryloyl group, an aryl group, and a vinyl group.

16. The method according to claim 12, wherein the photopolymerizable monomer in a molecule is selected from the group consisting of at least one of: an acryloyl group, a methacryloyl group, an aryl group, and a vinyl group.

17. The method according to claim 12, wherein the photopolymerization initiator is selected from the group consisting of at least one of: a benzoin ether, a ketal, a acetophenone, a benzophenone, and a thioxanthone.

18. The method according to claim 3, wherein the light curing resin comprises ultraviolet curable resin containing an additive comprising at least one of: a photopolymerization initiator aid, an anti-adhesive agent, a filler, a plasticizer, a non-reactive polymer, a colorant, a flame retardant, a flame retardant assistant, an anti-softening agent, a mold-release agent, a desiccant agent, a dispersant, a wetting agent, a suspending agent, a thickener, a charge-preventing agent, an antistatic agent, a flattening agent, an anti-blocking agent, an anti-skinning agent, a surfactant.

19. The method according to claim 3, wherein the light curing resin comprises a visible-light curable resin.

20. The method according to claim 19, wherein the visible-light curable resin is cured by irradiation with light having a wavelength of about 400 nm or more.

* * * * *